United States Patent [19]

Hirokawa et al.

[11] Patent Number: 5,182,239

[45] Date of Patent: Jan. 26, 1993

[54] ALUMINUM NITRIDE GRANULES AND PROCESS FOR THE PREPARATION THEREOF

[75] Inventors: Kiyofumi Hirokawa, Shinnanyo; Hitofumi Taniguchi, Tokuyama, both of Japan

[73] Assignee: Tokuyama Soda Kabushiki Kaisha, Tokuyama, Japan

[21] Appl. No.: 714,612

[22] Filed: Jun. 13, 1991

[30] Foreign Application Priority Data

Jun. 15, 1990 [JP] Japan .................................. 2-155030

[51] Int. Cl.$^5$ .............................................. C04B 35/58
[52] U.S. Cl. ........................................ 501/98; 501/96; 264/117
[58] Field of Search ................................ 501/96, 97, 98; 423/412; 264/117

[56] References Cited

FOREIGN PATENT DOCUMENTS 2-044068  2/1990  Japan .

OTHER PUBLICATIONS

Dimilia et al, "Dependence of Compaction on the Glass Transition Temperature of the Binder Phase", Ceram. Bull., vol. 62, No. 4, (1983) pp. 484–489.

*Primary Examiner*—Karl Group
*Attorney, Agent, or Firm*—Sherman and Shalloway

[57] ABSTRACT

Aluminum nitride granules which are characterized in that (a) they are composed mainly of aluminum nitride, (b) their bulk density ranges from 0.5 to 1.5 g/cc, (c) the mean particle diameter thereof is within the range of 20 to 500 μm, and (d) they have a breaking strength of 0.5 to 5.0 g. The aluminum nitride granules can be prepared by (1) mixing an aluminum nitride powder, a surfactant, a binder and an organic solvent, and optionally, at least one inorganic matter other than aluminum nitride, to form a slurry, (2) granulating the slurry, and (3) heating the resultant granulated particles to form the granules.

15 Claims, No Drawings

ALUMINUM NITRIDE GRANULES AND PROCESS FOR THE PREPARATION THEREOF

DETAILED EXPLANATION OF THE INVENTION

This invention relates to aluminum nitride granules and a process for the preparation thereof. More specifically, the invention relates to aluminum nitride granules suitable for molding high-density molded bodies (green bodies) of aluminum nitride powders and a process for their preparation.

Aluminum nitride sintered body exhibits high thermal conductivity and is attracting much attention as a useful material in the field of electronics.

For preparing aluminum nitride sintered bodies, such processes are known as the one comprising shaping aluminum nitride powder with a dry press and sintering the shaped body; or the one comprising wetshaping aluminum nitride powder to form a green sheet and sintering the same. In the former process using a dry press, the aluminum nitride powder is packed in a shaping mold as it is, and pressed with a pressing machine.

However, when aluminum nitride powder is used in the molding by dry press, the resultant molded body cannot have a sufficiently high density even when the press-molding is conducted under high pressure. When aluminum nitride green bodies of insufficient density is sintered, the resultant aluminum nitride sintered bodies have a defect of showing substantial shrinkage and lacking in dimensional stability.

An object of the present invention is to provide aluminum nitride granules having a specific high level of density, particle diameter and a breaking strength.

Another object of the present invention is to provide aluminum nitride granules fit for use in molding high-density aluminum nitride green bodies.

A further object of the present invention is to provide a process for advantageously preparing the aluminum nitride granules of the present invention.

Still other objects and advantages of the present invention will become apparent from the following explanations.

According to the present invention, above objects and advantages can be achieved first by aluminum nitride granules which are characterized in that
(a) they are composed mainly of aluminum nitride,
(b) their bulk density ranges from 0.5 to 1.5 g/cc,
(c) the mean granule diameter thereof is within the range of 20–500 μm, and
(d) they have a breaking strength of 0.5–5.0 g.

According to the present inventors' studies, when aluminum nitride granules are used as the starting material, a large number of microvoids attributable to the granule grain boundaries are apt to form in the green bodies. It has been further found that such fine voids interfere with the desirable rise in density of the aluminum nitride green bodies.

It has been now confirmed, however, that formation of such fine voids in the green bodies can be avoided when the aluminum nitride granules of the present invention having above-specified bulk density, granule diameter and breaking strength are used, and that high-density aluminum nitride green bodies can be obtained.

The aluminum nitride granules of the present invention are composed mainly of aluminum nitride, and are formed of fine aluminum nitride particles which will be explained later.

The granules of the present invention may contain, besides aluminum nitride, at least one inorganic matter, a surfactant and a binder as minor components.

The inorganic matter may serve as a sintering aid in the occasion of sintering the green bodies formed from the aluminum nitride granules of the present invention, or may be a colorant for the resultant sintered body.

As useful inorganic matters, for example, at least one member of the group consisting of the metals of Groups IIa, IIIa and IVa of the periodic table and their compounds is preferably used.

Of those inorganic matters, the metals of Groups IIa and IIIa of the periodic table or their compounds such as oxides and halides are suitable as sintering aid, and the metals of Group IVa or their compounds are preferred as a colorant.

Examples of such inorganic matters include calcium, yttrium, chromium, molybdenum, tungsten; their compounds such as oxides and halides; and their complex compounds such as calcium aluminate.

The inorganic matter or matters are used in an amount of not more than 10 parts by weight, preferably not more than 5 parts by weight, per 100 parts by weight of the aluminum nitride.

The granules of the present invention can further contain a surfactant and a binder, depending on specific embodiments of the preparation process which is described later.

The surfactant may be contained in the granules in an amount of not more than 10 parts by weight, preferably from 0.01 to 10 parts by weight, inter alia, 0.1 to 5 parts by weight, per 100 parts by weight of the aluminum nitride.

The binder may be contained in the granules in an amount of not more than 30 parts by weight, preferably from 0.1 to 30 parts by weight, inter alia, 1 to 10 parts by weight, per 100 parts by weight of the aluminum nitride.

As explained later, those surfactant and binder are organic compounds, and hence are the components that are burnt and lost during sintering of the green bodies prepared from the granules of the present invention.

The bulk density of the aluminum nitride granules of the present invention ranges from 0.5 to 1.5 g/cc. When it is less than 0.5 g/cc, many voids are ready to remain in the sintered body to reduce the latter's density so that it is difficult to form a sintered body of a high quality. On the other hand, it is difficult to prepare aluminum nitride having a bulk density exceeding 1.5 g/cc. For the purpose of ready prevention of void occurrence in the aluminum nitride green bodies, it is preferred that the bulk density is within the range of 0.8 to 1.3 g/cc.

The mean granule diameter of the granules of the present invention is within the range of 20 to 500 μm. When the mean diameter is less than 20 μm, the granules have too high bulk due to electrostatic repulsion between granules, for example, and in consequence a satisfactory bulk density cannot be obtained, which gives rise to such inconveniences as already described. On the other hand, when the mean particle diameter exceeds 500 μm, spaces between granules in the green bodies become too wide, which tends to cause residual presence of voids inside the sintered bodies. Thus, sintered bodies of high quality cannot be obtained.

For the purpose of obtaining high-density, aluminum nitride green bodies, the mean particle diameter of the aluminum nitride granules is preferably within the range of 25 to 300 μm. Coarse particles or exceedingly fine size particles are detrimental to the density of the aluminum nitride green bodies prepared from the granules of the present invention. It is, therefore, preferred that aluminum nitride granules having particle diameters of, in particular, less than 10 μm or greater than 800 μm each be present in an amount of not more than 5% by weight.

The breaking strength of the aluminum nitride granules of the present invention must be within the range of from 0.5 to 5.0 g. When it is less than 0.5 g, the granules are apt to be broken during such handling as transfer, or broken at early stage during press-molding. Such breakage hinders the granular particles from attaining the maximum fill ratio through mutual shifting and eventually causes failure in density rise of the green bodies. Whereas, when the breaking strength exceeds 5.0 g, many voids due to granule grain boundaries in the aluminum nitride granules tend to remain in the occasion of forming the aluminum nitride green bodies by press-molding. In view of the improvement in density of the green bodies, particularly preferred breaking strength of the aluminum nitride granules ranges from 0.7 to 4 g.

The shape of the aluminum nitride granules of the present invention is subject to no critical limitation, and is completely optional. Normally it is spherical or close thereto, which is attributable to the production process. For the purpose of obtaining high-density aluminum nitride green bodies containing the minimum voids, it is preferred that the granules of this invention are truly spherical in shape. For example, those of the shape in which the ratio of the shorter axis to the longer axis is at least 0.93 are preferred.

While the production process of the aluminum nitride granules of the present invention is not critical, the present invention provides a process which comprises (1) mixing an aluminum nitride powder, a surfactant, a binder and an organic solvent, and optionally, at least one inorganic matter other than aluminum nitride, to form a slurry,
(2) granulating the slurry, and
(3) heating the resultant granulated particles to form granules.

As the aluminum nitride powder to be used in above step (1), those of low oxygen content and cationic impurities content are preferred, for making aluminum nitride sintered bodies of excellent thermal conductivity. As such aluminum nitride powder, for example, when the composition of aluminum nitride is expressed as AlN, the powder of which oxygen content that forms impurities is not more than 1.5% by weight and cationic impurities content is not more than 0.3% by weight is conveniently used. An aluminum nitride powder containing 0.4–1.3% by weight of oxygen and not more than 0.2% by weight, in particular not more than 0.1% by weight, of cationic impurities is more preferred. It should be noted that "aluminum nitride" signifies a 1:1 aluminum-nitrogen compound in the present invention, and all other components are regarded as impurities. The surfaces of aluminum nitride powder, however, are unavoidably oxidized in the air, and Al—N bonds are replaced by Al—O bonds. Such bound Al is not deemed to be a cationic impurity. Therefore, aluminum metals not bound as Al—N or Al—O in the powder are a cationic impurity.

The aluminum nitride powder to be used in the present invention is preferably composed of particles of a uniform, small diameter. For example, the powder particles preferably have a mean particle diameter (the mean particle diameter of aggregated particles measured with a centrifugation-type particle size distribution measuring device, e.g., CAPA 500® manufactured by Horiba, Ltd) not greater than 5 μm, more preferably not greater than 3 μm, inter alia, not greater than 2 μm.

As the surfactant to be used in the step (1), any of known surfactants are usable free of any limitations. In particular, those of which hydrophilic-lipophilic balance (HLB) ranges from 4.5 to 18, more preferably 6.0 to 10.0, can be advantageously used for increasing density of the aluminum nitride green bodies. The "HLB" in the present invention is determined by the equation of Davis.

Specific examples of the surfactants conveniently usable in the present invention include carboxylated trioxyethylene tridecylether, diglycerine monooleate, diglycerine monostearate, carboxylated heptaoxyethylene tridecylether, tetraglycerine monooleate, hexaglycerine monooleate, polyoxyethylenesorbitan monolaurate and polyoxyethylenesorbitan monooleate. As the surfactant in the present invention, more than one kind may be used concurrently. The HLB in such a case can be calculated as the arithmetic mean of HLB's of the surfactants used.

Also as the binder, any of those generally used in molding ceramic powders can be used free of any limitations. For example, oxygen-containing organic polymers such as polyvinyl butyral, polymethyl methacrylate, polyethyl methacrylate, poly-2-ethylhexyl methacrylate, polybutyl methacrylate, polyacrylate, cellulose acetate butylate, nitrocellulose, methyl cellulose, hydroxymethyl cellulose, polyvinyl alcohol, polyethylene oxide and polypropylene oxide; hydrocarbon synthetic resins such as petroleum resins, polyethylene, polypropylene and polystyrene; polyvinyl chloride; waxes and emulsions thereof, etc., can be used either singly or in combination. While molecular weight of such organic polymers used as the binder is not critical, normally those of the molecular weight of 3,000–1,000,000, preferably 5,000–300,000, are used. When organic polymers of the molecular weight within such ranges are used as the binder, density of the aluminum nitride green bodies formed by press-molding can be raised with ease, and hence such molecular weight ranges are preferred.

As the organic solvents useful in the step (1) of the production of the aluminum nitride granules of the present invention, for example, ketones such as acetone, methyl ethyl ketone and methyl isobutyl ketone; alcohols such as ethanol, propanol and butanol; aromatic hydrocarbons such as benzene, toluene and xylene; or hydrocarbon halides such as trichloroethylene, tetrachloroethylene and bromochloromethane, etc. can be used either singly or in combination.

For the purpose of producing favorable aluminum nitride granules, these surfactant, binder and organic solvent are normally used in the following amounts, per 100 parts by weight of the aluminum nitride powder; preferably 0.01 to 10 parts by weight, more preferably 0.02 to 3.0 parts by weight, of the surfactant; preferably 0.1 to 30 parts by weight, more preferably 2.0 to 15 parts by weight, of the binder; and preferably 20 to 200 parts by weight, more preferably 50 to 150 parts by weight, of the organic solvent.

The other inorganic matter or matters which are used in the step (1) when the occasion demands, serve as the sintering aid or colorant which have been already described. Such inorganic matter or matters are used in an amount of not more than 10 parts by weight per 100 parts by weight of the aluminum nitride powder.

The foregoing components are mixed in the step (1) to form a viscous, paint-like slurry.

Such a slurry has a density preferably ranging 0.9 to 2.6 g/ml, more preferably 1.0 to 2.1 g/ml.

Then in the step (2), the slurry is granulated by the methods known per se, such as spray dryer process or the like.

The granulated particles are then heated in the step (3) to provide the granules of the present invention.

During the heating in the step (3), evaporation of the organic solvent and occasionally partial decomposition of the binder and surfactant take place.

The heating temperatures are preferably within the range of 50° to 250° C., more preferably 80° to 200° C.

The heating time may range from 0.5 to 36 hours, more preferably from 1 to 25 hours.

When heating is performed at a relatively lower temperature, a prolonged period of heating time is preferably employed. For example, in the case where heating temperature is not higher than 150° C., heating is carried out in a course of not less than 12 hours. The reason is that when the aluminum nitride green bodies prepared under the aforesaid conditions in accordance with this invention is sintered, the resultant sintered bodies exhibit little shrinkage.

The heating atmosphere may be that of air, while it is of course permissible to use a non-oxidizing atmosphere such as of nitrogen, for example.

Thus, the aluminum nitride granules of the present invention can be prepared.

The aluminum nitride granules of the present invention are suitable as a starting material in the production of aluminum nitride green bodies by dry press-molding. That is, when the aluminum nitride granules of the present invention are used to prepare aluminum nitride green bodies by dry press-molding, high density green bodies containing little void can be obtained. Because such green bodies exhibit shrinkage as little as up to about 17% at sintering, they give aluminum nitride sintered bodies of good dimensional stability.

Consequently, the aluminum nitride sintered bodies obtained from the granules of the present invention are industrially very useful for making heat-transfer substrates of electronic devices and apparatuses, electronic circuit boards, various heat-transfer materials, and insulation materials.

EXAMPLE 1

The present invention will be more specifically explained by working and control examples given below, but it should be understood that the present invention is in no way limited by these examples.

In the following examples, the measurements of various physical properties were conducted in the following manners.

(1) Bulk density:

The tapping bulk density was measured with "A.B.D. powder characteristics measuring device" manufactured by Tsutsui Rikagaku Kikai Co., Ltd.

(2) Breaking strength:

Each particle having the diameter within the mean diameter of the sample granules ±5 μm were placed at three vertexes of a regular triangle of 5 mm in one side length, and gently loaded from above. The load under which at least one of the three particles was broken was recorded as the breaking strength of the granules. The measurement was repeated ten times per one sample granules, the maximum and minimum values were excluded, and the mean value of the remaining eight measurements was calculated.

(3) Density of green body:

Density was calculated from the dimensions and weight of each green body, from which the density of corresponding green body composed exclusively of AlN powder was determined.

$$\text{Density} = \text{green density} \times \frac{\text{AlN weight in slurry}}{\text{slurry weight} - \text{organic solvent}}$$

(4) Density of AlN sintered body:

This was determined by Archimedes's method, using "High-precision Specific gravity meter D-H" manufactured by Toyo Seiki Seisakusho Ltd.

(5) Shrinkage at sintering time:

This was determined by dimension measurements before and after sintering, according to the equation below.

$$\text{Shrinkage} = \frac{1 - \text{dimensions of sintered body}}{\text{dimensions of green body before sintering}} \times 100$$

EXAMPLE 1

A nylon pot of 2 liters in capacity was charged with nylon balls having iron cores. Then, into the pot were poured 100 parts of an aluminum nitride powder as identified in Table 1, 3.0 parts of calcium oxide, 2.0 parts of hexaglycerine monooleate as a surfactant, 5.0 parts of butyl methacrylate as a binder and 100 parts of toluene as a solvent, the parts being by weight. The system was thoroughly mixed in the ball mill to provide a white slurry having the slurry density of 1.40 g/ml.

Thus obtained slurry was granulated by spray dryer method, and then, heated for 5 hours at 180° C. to prepare aluminum nitride granules. The breaking strength, bulk density, mean granule diameter, particle size distribution and degree of sphericity of the resultant granules were measured.

Using the granules, a green body of 1 in. sq. in area and 1 mm in thickness was prepared under a pressure of 1.0 T/cm$^2$, and its density was measured. This green body was sintered in air, at 600° C. for 5 hours, and then put in a carbon crucible onto the inner surface of which boron nitride had been coated and sintered in a nitrogen atmosphere at 1800° C. for 10 hours. Thus, a sintered body was obtained. The results are shown in Table 2.

TABLE 1

| Impurities content (wt. %) | O | 0.9 |
| | C | 0.03 |
| | Si | 0.004 |
| | Fe | not detected |
| | Other cations | not more than 0.05 |
| Mean diameter of aggregates (μm) | | 1.5 |
| Specific surface area (m$^2$/g) | | 3.5 |

TABLE 2

| | Degree of Granules | | | | | Density of green body (g/cm³) | Density of sintered body (g/cm³) | Shrinkage (%) |
|---|---|---|---|---|---|---|---|---|
| | Breaking strength (g) | Bulk density (g/cm³) | Mean granule diameter (μm) | Degree of sphericity | Particle size distribution[2] (%) | | | |
| Example 1 | 1.4 | 1.21 | 113 | 0.95 | 0 | 1.94 | 3.26 | 15.6 |
| Control 1 | 0.3 | 1.07 | 113 | 0.95 | 0 | 1.79 | 3.26 | 18.0 |
| Control 2 | — | 0.37[1] | — | — | — | 1.67 | 3.26 | 20.0 |

[1] This is the tapping bulk density of aluminum nitride powder.
[2] The particle size distribution is defined by the ratio of the particles of the diameters less than 10 μm to those of the diameters exceeding 800 μm.

CONTROL 1

Example 1 was repeated except that the heating was omitted in the course of preparing the aluminum nitride granules. The properties of the resultant green body and the sintered body are shown concurrently in Table 2.

CONTROL 2

The aluminum nitride powder as shown in Table 1 was pressed under a pressure of 2.0 T/cm² to prepare a green body of a 20 mm in diameter and 1 mm in thickness, which was then sintered in the identical manner with Example 1. The properties of the green body and the sintered body are shown concurrently in Table 2.

EXAMPLES 2-9

Various aluminum nitride granules were prepared by varying the model of spray dryer used and the heating conditions in each run. Those granules were used to form the green bodies and subsequently sintered bodies in the manner identical with Example 1. Their properties are shown in Table 3. None of the granules contained the particles of a size less than 10 μm or exceeding 800 μm.

TABLE 3

| Ex. | Heating conditions | Properties of Granules | | | | Density of green body (g/cm³) | Density of sintered body (g/cm³) | Shrinkage (%) |
|---|---|---|---|---|---|---|---|---|
| | | Breaking strength (g) | Bulk density (g/cm³) | Mean granule diameter (μm) | Degree of sphericity | | | |
| 2 | 80° C., 25 hrs. | 0.8 | 1.09 | 121 | 0.94 | 1.88 | 3.25 | 16.5 |
| 3 | 100° C., 20 hrs. | 1.7 | 1.11 | 74 | 0.96 | 1.90 | 3.26 | 16.3 |
| 4 | 100° C., 20 hrs. | 3.4 | 0.88 | 292 | 0.94 | 1.87 | 3.25 | 16.7 |
| 5 | 130 C., 25 hrs. | 1.5 | 1.23 | 96 | 0.95 | 2.02 | 3.26 | 14.5 |
| 6 | 180 C., 1 hr. | 0.9 | 1.12 | 59 | 0.97 | 1.89 | 3.26 | 16.4 |
| 7 | 180 C., 5 hrs. | 1.1 | 1.18 | 61 | 0.96 | 1.93 | 3.26 | 15.8 |
| 8 | 180 C., 5 hrs. | 2.5 | 1.04 | 208 | 0.94 | 1.91 | 3.26 | 16.1 |
| 9 | 200° C., 3 hrs. | 3.7 | 0.97 | 132 | 0.95 | 1.89 | 3.26 | 16.4 |

We claim:

1. Aluminum nitride granules which are characterized in that
   (a) they are composed mainly of aluminum nitride,
   (b) their bulk density ranges from 0.5 to 1.5 g/cc,
   (c) the mean granule diameter thereof is within the range of 20 to 500 μm, and
   (d) they have a breaking strength of 0.5 to 5.0 g.

2. The aluminum nitride granules as defined in claim 1, which contain inorganic matters(s) other than aluminum nitride in an amount not more than 10 parts by weight, per 100 parts by weight of aluminum nitride.

3. The aluminum nitride granules as defined in claim 2, in which the inorganic matter(s) are selected from the group consisting of the metals of Group IIa, IIIa and IVa of the periodic table and compounds of those metals.

4. The aluminum nitride granules as defined in claim 2, in which the inorganic matter(s) are selected from the group consisting of calcium, yttrium, chromium, molybdenum, tungsten and compounds of those metals.

5. The aluminum nitride granules as defined in claim 2, in which the inorganic matter is calcium aluminate.

6. The aluminum nitride granules as defined in claim 1, which contain 0.01 to 10 parts by weight of a surfactant, per 100 parts by weight of aluminum nitride.

7. The aluminum nitride granules as defined in claim 1, which contain 0.1 to 30 parts by weight of a binder, per 100 parts by weight of aluminum nitride.

8. A process for preparing the aluminum nitride granules of claim 1, which comprises:
   (1) mixing an aluminum nitride powder, a surfactant, a binder and an organic solvent, and optionally, at least one inorganic matter other than aluminum nitride, to form a slurry,
   (2) granulating the slurry, and
   (3) heating the resultant granulate particles at temperatures ranging from 50° to 250° C. to form the granules.

9. The process as defined in claim 8, in which the aluminum nitride powder has a mean particle diameter of not greater than 2 μm, an oxygen content of not more than 1.5% by weight and a cationic impurities content of not more than 0.3% weight.

10. The process as defined in claim 8, in which the surfactant is used in an amount of 0.01 to 10 parts by weight, per 100 parts by weight of the aluminum nitride powder.

11. The process as defined in claim 8, in which the binder is used in an amount of 0.1 to 30 parts by weight, per 100 parts by weight of the aluminum nitride powder.

12. The process as defined in claim 8, in which an organic solvent is used in an amount of 20 to 200 parts by weight, per 100 parts by weight of the aluminum nitride powder.

13. The process as defined in claim 8, in which the inorganic matter(s) is(are) used in an amount of not more than 10 parts by weight, per 100 parts by weight of the aluminum nitride powder.

14. The process as defined in claim 8, in which the slurry has a density ranging from 0.9 to 2.6 g/ml.

15. The process as defined in claim 8, in which the heating is conducted for a period ranging from 0.5 to 36 hours.

* * * * *